United States Patent
Kozak

[11] Patent Number: 5,861,857
[45] Date of Patent: Jan. 19, 1999

[54] VEHICULAR WINDSHIELD WIPER ANTENNA SYSTEM

[76] Inventor: David Kozak, 6512 E. Monterosa, Scottsdale, Ariz. 85251

[21] Appl. No.: 796,982

[22] Filed: Feb. 7, 1997

[51] Int. Cl.[6] .................................................. H01Q 1/32
[52] U.S. Cl. ........................... 343/711; 343/712; 343/713
[58] Field of Search ................................ 343/711, 712, 343/713, 714, 715, 895; H01Q 1/32

[56] References Cited

U.S. PATENT DOCUMENTS

| 2,520,986 | 9/1950 | Williams et al. | 343/712 |
| 4,757,322 | 7/1988 | Yokogawa et al. | 343/712 |

FOREIGN PATENT DOCUMENTS 799983  1/1981  U.S.S.R. ................................. 343/711

*Primary Examiner*—Hoanganh Le
*Attorney, Agent, or Firm*—Meschkow & Gresham, P.L.C.; Jordan M. Meschkow; Lowell W. Gresham

[57] ABSTRACT

A vehicular antenna system uses a plurality of vehicle windshield wipers. Each wiper is configured to act as an antenna receiving element. The wipers may be configured to act as receiving elements by using a conductive wiper housing and/or a conductive spring. Insulators are positioned to electrically isolate the antenna receiving elements from vehicular ground. In one embodiment, an insulating bushing is positioned within a windshield wiper housing aperture so that the entire wiper is isolated from a wiper shaft.

15 Claims, 5 Drawing Sheets

VEHICULAR WINDSHIELD WIPER ANTENNA SYSTEM

FIELD OF THE INVENTION

The present invention relates generally to antennas for receiving radio frequency signals. More particularly, the present invention relates to a vehicular antenna system which utilizes windshield wipers.

BACKGROUND OF THE INVENTION

In automobiles and other vehicles, antenna systems are necessary for reception of radio waves and also television broadcast signals. A traditional monopole type antenna has served this function and is one of the conventional antenna systems available. The monopole antenna projects outward of the exterior of the vehicle and exhibits satisfactory performance in the reception of radio waves. However, the monopole and other externally projecting antennas are obstructions in the design of vehicle bodies, are easily damaged, and are a source of unwanted wind noise.

Moreover, a modern trend in the field automobiles is to include a variety of receivers and transmitters, each of which has its own antenna. For example, a modern vehicle may have an antenna for broadcast radio, another antenna for a cellular radio telephone or a 2-way radio, and yet another antenna for television reception. Unfortunately, the addition of more externally projecting antennas exacerbates the problems of externally projecting antennas on vehicles.

Some attempts have been made to improve on the externally projecting antennas by embedding antennas in windshields, relying upon electrical currents induced on the vehicle body, and the like. Unfortunately, attenuation of radio signals by the vehicle body has led to undesirably poor reception. In addition, such conventional approaches have been susceptible to electrical noise which is generated by the motor and other components of the vehicle. Furthermore, such systems tend to require an excessive number of components and complex manufacturing processes, each of which raises costs to undesirably high levels.

SUMMARY OF THE INVENTION

Accordingly, it is an advantage of the present invention to provide an improved vehicular windshield wiper antenna system.

Another advantage is to provide a vehicular antenna system which does not require additional external protrusions on a vehicle.

Another advantage is to provide a vehicular antenna system which uses only a few components and requires no complex manufacturing processes.

Another advantage is to provide a vehicular antenna system which provides good reception.

The above and other advantages of the present invention are carried out in one form by a vehicular antenna system that includes a vehicular windshield wiper. An insulator is coupled to the wiper. An antenna signal conductor is connected to the wiper. The insulator and the conductor are configured to prevent grounding of received radio signals.

BRIEF DESCRIPTION OF THE DRAWINGS

The foregoing and further and more specific advantages of the instant invention will become readily apparent to those skilled in the art from the following detailed description of preferred embodiments thereof taken in conjunction with the drawings, in which.

DETAILED DESCRIPTION OF THE DRAWINGS

Figure 1:
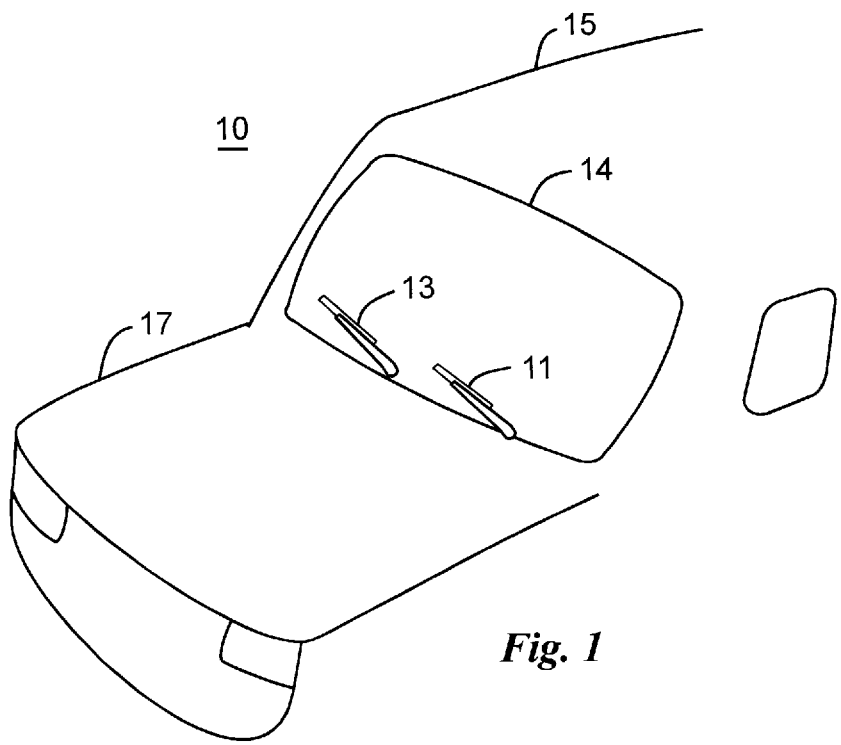
FIG. 1 is a perspective view of an automobile's front windshield with windshield wipers in which an antenna system in accordance with the teaching of the present invention is installed.

Turning now to the drawings in which like reference numbers indicate corresponding elements throughout the various views, attention is first directed to FIG. 1 which illustrates a perspective view of an automobile 10 with front windshield wipers 11 and 13. Front hood 17, windshield 14 and roof 15 are included for reference. An embodiment of the instant invention is an antenna system which uses windshield wipers 11 and 13, as further explained by FIG. 2.

Figure 2:
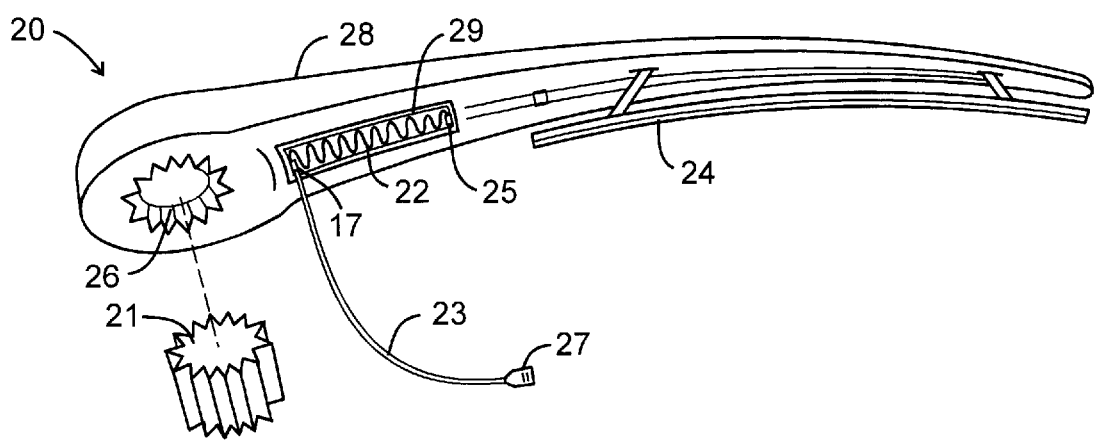
FIG. 2 is an exploded perspective view of an automobile windshield wiper configured in accordance with the teaching of the present invention and its relationship to a wiper shaft.

FIG. 2 presents a perspective view of an automobile windshield wiper 20 and its relationship to a wiper shaft 21. Either or both of wipers 11 and 13 (see FIG. 1) may be configured as wiper 20. Wiper 20 includes a wiper housing 28, a wiper element 24, a wiper shaft aperture 26, and a conductive wire spring 22 connected to a spring wire connector 27.

Wire spring 22 serves as a radio wave receiving element. An antenna wire 23 conducts radio signals picked up by spring 22 to a receptacle 27, which connects to a vehicle receiver circuit (not shown).

Wiper shaft 21 is a conventional vehicular component which pivots back and forth when activated to impart motion to wiper 20. In many vehicles, wiper shaft 21 is electrically connected to ground. Accordingly, in the embodiment depicted in FIG. 2, spring 22 is electrically insulated from wiper shaft 21 to prevent grounding of received radio signals. In one embodiment, electrical insulation is achieved by forming wiper housing 28, at least in part, from non-conductive materials. In another embodiment, electrical insulation is achieved by lining a compartment 29 in which spring 22 resides with an insulating material and attaching spring 22 in place using insulator mounting clips 25. In another embodiment which is discussed in more detail below, wiper housing 28 is electrically insulated from shaft 21 through the use of an insulating bushing (not shown) located within aperture 26.

Desirably, spring 22 is configured as a coil. This permits a relatively long length of wire to be confined in a relatively small space. The uncoiled length of this wire is desirably selected in a manner well known to those skilled in the art to be advantageous for radio wave reception of a desired radio frequency band. Desirably, spring 22 serves the dual role of radio wave receiving element and compression spring. Thus, spring 22 also performs a compression function which urges wiper element 24 toward a windshield 14 (see FIG. 1).

Figure 3:
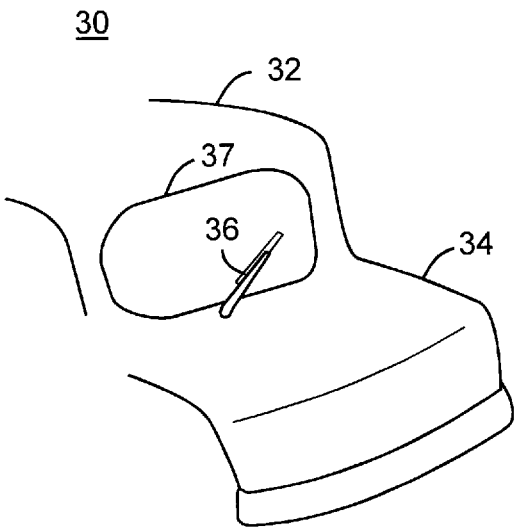
FIG. 3 is a perspective view of an automobile's rear windshield with a windshield wiper in which an antenna system installed according to the teaching of the present invention.

FIG. 3 illustrates a perspective view of a rear windshield wiper 36 on a rear windshield 37. Vehicle roof 32 and trunk 34 are shown for reference. Rear windshield wiper 36 is desirably configured similarly to wiper 20, shown in FIG. 2. Therefore, there is a plurality of antenna elements within the front and rear windshield wipers 11, 13 and 36 as illustrated in FIGS. 1 and 3.

Figure 4:
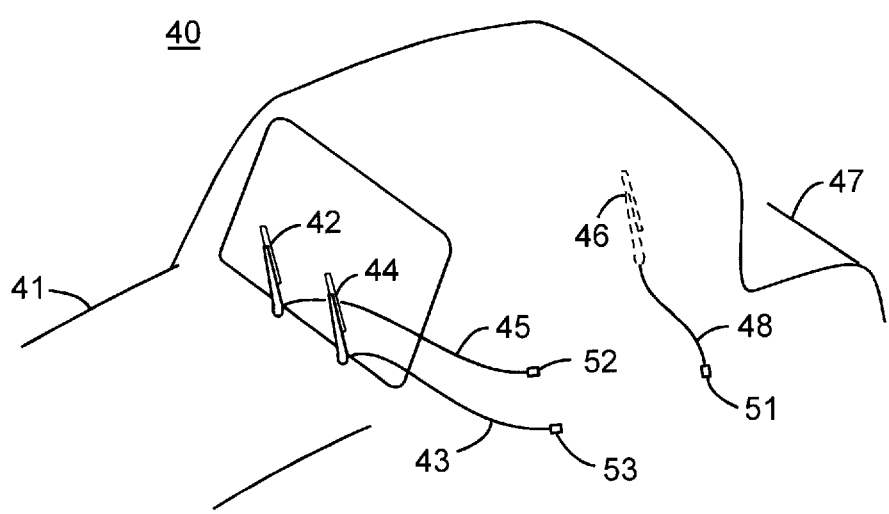
FIG. 4 is a perspective view of an automobile with a plurality of windshield wipers in accordance with the antenna system of the present invention.

FIG. 4 further illustrates an automobile antenna system 40 comprised of three windshield wipers 42, 44, and 46 with respective antenna wires 45, 43, and 48. Wipers 42, 44, and 46 are desirably configured like wiper 20, shown in FIG. 2. Receptacles 52, 53, and 51 connect to a receiver circuit (not shown) in the vehicle as will be discussed further in FIG. 6. A vehicle hood 41 and trunk 47 are included for reference in FIG. 4.

Figure 5:
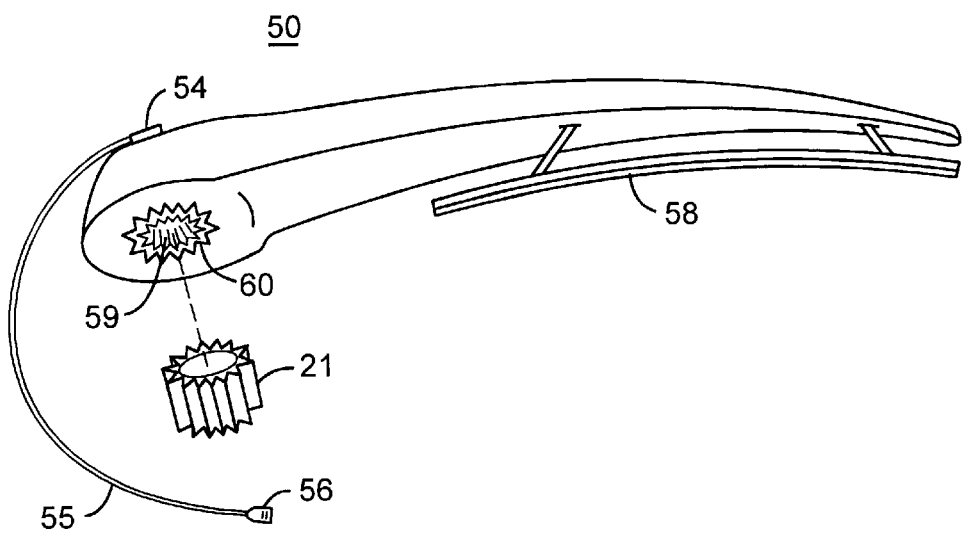
FIG. 5 is an exploded perspective view of an automobile windshield wiper in accordance with the antenna system of the present invention.

FIG. 5 illustrates a perspective view of an embodiment of the present invention, illustrating a windshield wiper 50 comprising wiper housing 57, wiper element 58, wiper shaft aperture 59 with insulating bushing 60. Wiper 50 is shown relative to wiper shaft 21. In this embodiment of the present invention, wiper housing 57 serves as an antenna receiving element. At a connector 54, wiper housing 57 connects to antenna signal conductor wire 55, which terminates at a connector 56. Connector 56 provides a received signal to a receiver circuit further discussed in FIGS. 6 and 7. Wiper housing 57 is desirably formed of a metallic or otherwise conductive material. Thus, wiper housing picks up radio waves. These radio waves are conducted to the vehicle receiver circuit by means of antenna wire 55 and connector 56. Insulating bushing 60 insulates the metallic wiper housing 57 from the vehicle to prevent grounding of the received radio signals.

Figure 6:
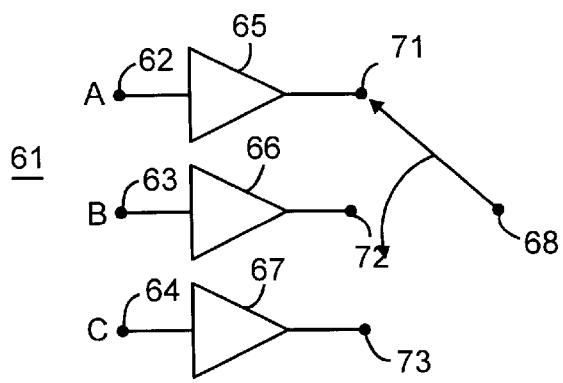
FIG. 6 is a simplified schematic drawing of a antenna consolidating circuit.

FIG. 6 illustrates a simplified schematic circuit of a radio wave receiving circuit 61 comprised of antenna inputs 62, 63 and 64. Inputs 62, 63 and 64 correspond to three vehicular windshield wipers containing antenna receiving elements as discussed above. Antenna inputs 62, 63 and 64 are amplified by amplifiers 65, 66 and 67 whose signals are accessible at terminations 71, 72 and 73. A simplified signal consolidating or switching mechanism 68 can select any of the signals for selective switching between the three antenna inputs 62, 63, or 64.

Figure 7:
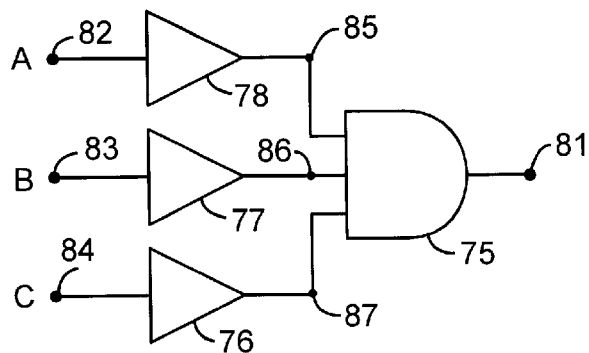
FIG. 7 is a simplified schematic drawing of a second antenna consolidating circuit.

A mixing circuit 70 is illustrated in FIG. 7 comprised of antenna inputs 82, 83 and 84 from antenna elements configured as discussed above. Signals conducted through antenna inputs 82, 83 and 84 are amplified by amplifiers 78, 77 and 76 to provide output signals 85, 86 and 87 into a signal mixer 75. Signal mixer 75 takes in the three amplified output signals 85, 86 and 87 to consolidate and produce one output signal 81 to the vehicle receiver.

While an antenna system configured in accordance with the present invention can exhibit acceptable reception using a single wiper, improved performance results from using multiple wiper-antennas. Regardless of whether a consolidating circuit as shown in FIGS. 6 or 7 or another consolidating circuit is used to consolidate multiple antenna signals from multiple antenna receiving elements, the multiple receiving elements of multiple wipers tend to be isolated from each other and no cross interference occurs. Isolation is achieved because, in most modern vehicles, the wipers tend to remain spaced apart from one another even while activated.

Figure 8:
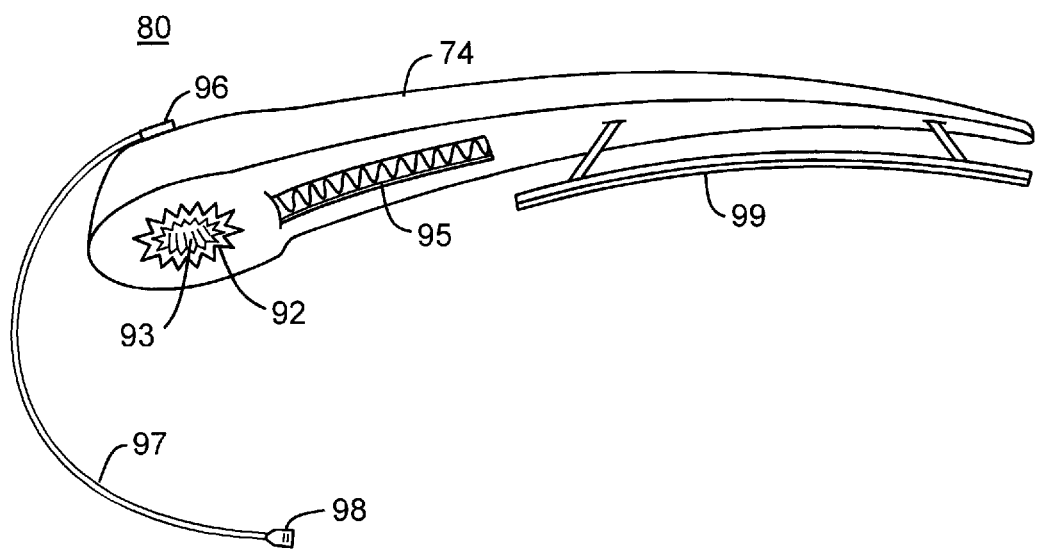
FIG. 8 is a perspective view of an automobile windshield wiper in accordance with the present invention.

FIG. 8 illustrates a perspective view of an embodiment of the present invention, illustrating a windshield wiper 80 comprising wiper housing 94, wiper element 99, wiper shaft aperture 93 with insulating bushing 92. In this embodiment of the present invention, wiper housing 94 serves as an antenna receiving element, and the antenna receiving element of wiper housing 94 is augmented by antenna spring element 95, which also serves as an antenna receiving element. Radio wave signals received at the receiving elements of housing 94 and spring 95 are conducted unto connection 96, through an antenna wire 97, and terminating at a connector 98 into a receiver circuit, such as shown and previously discussed in connection with FIGS. 6 and 7. Wiper housing 94 and spring 95 are formed from conductive materials so that they will pick up radio waves which are conducted to the vehicle receiver circuit by means of antenna wire 97 and connector 98. Insulating bushing 92 serves as an insulator which insulates the metallic wiper housing 94 and spring 95 from the vehicle to prevent grounding of the received radio signals.

Figure 9:
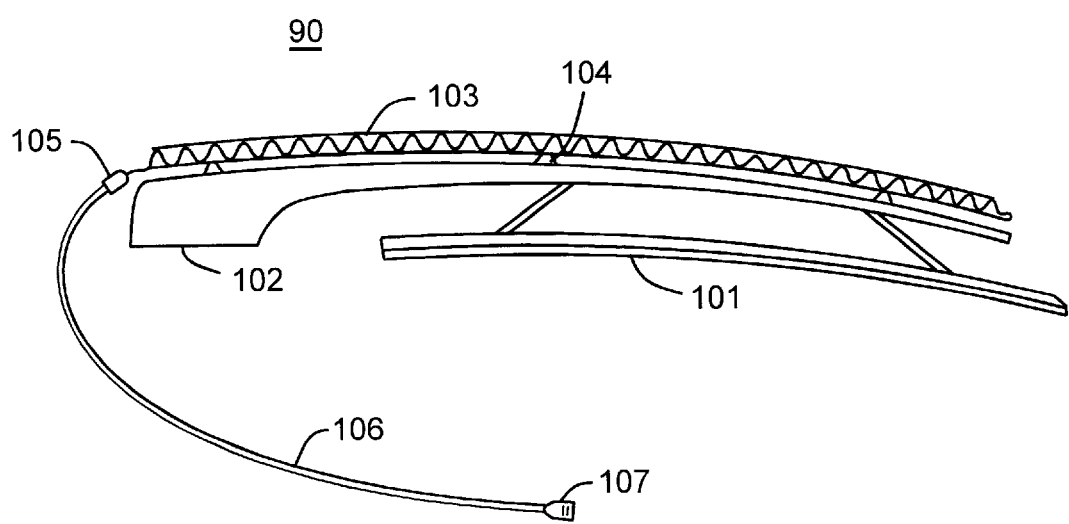
FIG. 9 is a side view of an automobile windshield wiper in accordance with the present invention.

A side view of one embodiment of windshield wiper 90 is illustrated in FIG. 9. Wiper 90 comprises windshield wiper housing 102, a wiper element 101, a spring 103 mounted by means of insulating mechanical fasteners 104. Antenna spring element 103 is connected to a connection 105 with a wire element 106 which leads to a receiver connection 107. An exterior or top mounting of antenna spring element 103 allows for an increase in length of spring 103 for improved bandwidth reception of radio or television signals. Although not shown, spring 103 may be enclosed within a non-conductive housing if desired.

In summary, the present invention provides an improved vehicular windshield wiper antenna system. This windshield wiper antenna system does not require additional external protrusions on a vehicle beyond those already present for the windshield wiper function. The antenna system of the present invention uses only a few components and does not require complex manufacturing processes. Good reception results from using a single wiper-antenna. However, reception improves when additional wiper-antennas are used on a vehicle.

Although preferred embodiments of the present invention have been illustrated and described, those skilled in the art will appreciate that various modifications may be made therein without departing from the spirit of the invention or from the scope of the appended claims. For example, those skilled in the art will appreciate that antenna receiving elements can also function as antenna transmitting elements. These and other modifications are included within the scope of the present invention.

What is claimed is:

1. In a vehicle having a wiper shaft electrically connected to a vehicle ground, a vehicular antenna system comprising:
   a vehicular windshield wiper;
   an antenna signal conductor connected to said wiper; and
   an insulator coupled to said wiper said insulator being configured to electrically insulate said vehicular windshield wiper from said wiper shaft so as to prevent grounding of received radio signals to said vehicle ground.

2. A vehicular antenna system as claimed in claim 1 additionally comprising a conductive spring physically mounted to said wiper and electrically coupled to said conductor, said spring serving as an antenna receiving element.

3. A vehicular antenna system as claimed in claim 2 wherein said spring is configured as a coil.

4. A vehicular antenna system as claimed in claim 1, wherein said vehicle has a second wiper shaft, and said system further comprises:

a second vehicular windshield wiper;

a second antenna signal conductor connected to said second wiper;

a second insulator coupled to said second wiper, said second insulator being configured to electrically insulate said vehicular windshield wiper from said second wiper shaft to prevent grounding of said received radio signals to said vehicle ground; and means, coupled to said antenna signal conductor and said second antenna signal conductor, for consolidating said received radio signals conveyed by said conductor and said second conductor.

5. A vehicular antenna system as claimed in claim 4, wherein said vehicle has a third wiper shaft, and said system further comprises:

a third vehicular windshield wiper;

a third antenna signal conductor connected to said third wiper and said consolidating means; and a third insulator coupled to said third wiper, and configured to electrically insulate said third wiper from said third wiper shaft.

6. A vehicular antenna system as claimed in claim 1 wherein said windshield wiper has a conductive housing which serves as an antenna receiving element and said conductor electrically couples to said housing.

7. A vehicular antenna system as claimed in claim 6 wherein said housing has a wiper shaft aperture, and said insulator comprises a non-conductive bushing positioned in said aperture.

8. A vehicular antenna system as claimed in claim 1 additionally comprising a conductive spring physically mounted on an exterior surface of said wiper and electrically coupled to said conductor, said spring serving as an antenna receiving element.

9. In a vehicle having a windshield, a vehicular antenna system comprising:

a vehicular windshield wiper having a wiper housing configured to retain a wiper element;

a conductive spring located in said wiper housing, said spring serving as an antenna receiving element, and said spring serving to urge said wiper element toward said windshield; and an antenna signal conductor connected to said spring.

10. A vehicular antenna system as claimed in claim 9 wherein:

said wiper housing is configured for attachment to a wiper shaft of said vehicle; and said spring is electrically insulated from said wiper shaft.

11. A vehicular antenna system as claimed in claim 9 wherein said spring is configured as a coil.

12. A vehicular antenna system as claimed in claim 9 additionally comprising:

a second vehicular windshield wiper having a second wiper housing configured to retain a second wiper element;

a second conductive spring located in said second wiper housing, said second spring serving as an antenna receiving element, and said spring serving to urge said second wiper element toward said windshield;

a second antenna signal conductor connected to said second spring; and means, coupled to said antenna signal conductor and said second antenna signal conductor, for consolidating received radio signals conveyed by said conductor and said second conductor.

13. In a vehicle, a vehicular antenna system comprising:

a first vehicular windshield wiper having a first conductive housing configured to serve as an antenna receiving element which receives first radio signals;

a first insulator coupled to said first housing;

a first antenna signal conductor electrically coupled to said first housing so as to conduct said first radio signals, said first conductor being coupled to said first insulator so as to prevent grounding of said first radio signals to said vehicle;

a second vehicular windshield wiper having a second conductive housing configured to serve as an antenna receiving element which receives second radio signals;

a second insulator coupled to said second housing;

a second antenna signal conductor electrically coupled to said second housing so as to conduct said second radio signals, said second conductor being coupled to said second insulator so as to prevent grounding of said second radio signals to said vehicle; and means, coupled to said first and second antenna signal conductors, for consolidating said first and second received radio signals conveyed by said first and second antenna signal conductors, respectively.

14. A vehicular antenna system as claimed in claim 13 wherein said vehicle has first and second wiper shafts electrically connected to a vehicle ground of said vehicle, and said system further comprises:

said first and second wiper housings having first and second wiper shaft apertures; and said first and second insulator comprising first and second non-conductive bushings, respectively, positioned in said first and second apertures, respectively, said first and second insulators being configured to electrical isolate said first and second windshield wipers from said first and second wiper shafts.

15. A vehicular antenna system as claimed in claim 13 additionally comprising:

a first conductive spring physically mounted to said first wiper and electrically coupled to said first conductor, said first spring serving as an antenna receiving element; and a second conductive spring physically mounted to said second wiper and electrically coupled to said second conductor, said second spring serving as an antenna receiving element.

* * * * *